(12) United States Patent
Kano

(10) Patent No.: US 9,742,967 B2
(45) Date of Patent: Aug. 22, 2017

(54) IMAGE CAPTURE APPARATUS CAPABLE OF CORRECTING EFFECTS OF OPTICAL CHARACTERISTICS OF A LENS UNIT ON AN IMAGE AND CONTROL METHOD THEREOF, AND LENS UNIT

(71) Applicant: CANON KABUSHIKI KAISHA, Tokyo (JP)

(72) Inventor: Akira Kano, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/943,660

(22) Filed: Jul. 16, 2013

(65) Prior Publication Data

US 2014/0022418 A1    Jan. 23, 2014

(30) Foreign Application Priority Data

Jul. 20, 2012    (JP) .................................. 2012-162122

(51) Int. Cl.
*H04N 5/217* (2011.01)
*H04N 5/357* (2011.01)
(Continued)

(52) U.S. Cl.
CPC ............ *H04N 5/217* (2013.01); *G03B 17/14* (2013.01); *H04N 5/23203* (2013.01); *H04N 5/23209* (2013.01); *H04N 5/3572* (2013.01)

(58) Field of Classification Search
CPC .. H04N 5/217; H04N 5/3572; H04N 5/23209; H04N 5/23203; G03B 17/14
(Continued)

(56) References Cited

U.S. PATENT DOCUMENTS

| 2010/0026875 A1* | 2/2010 | Shirai ................... G03B 17/18 348/335 |
| 2010/0208095 A1* | 8/2010 | Sugimori .................. 348/222.1 |
| 2012/0147218 A1* | 6/2012 | Shirai ....................... 348/231.3 |

FOREIGN PATENT DOCUMENTS

| CN | 101815175 A | 8/2010 |
| CN | 102445817 A | 5/2012 |

(Continued)

OTHER PUBLICATIONS

Jan. 31, 2014 Partial European Search Report of which is enclosed of the counterpart European Patent Application No. 13176724.6.
(Continued)

*Primary Examiner* — Albert Cutler
(74) *Attorney, Agent, or Firm* — Cowan, Liebowitz & Latman, P.C.

(57) ABSTRACT

A plurality of types of interchangeable lenses having mutually different optical parameters required for identifying the optical correction values can be attached to the image capture apparatus. First, predetermined optical parameters are obtained regardless of what type of interchangeable lens is attached. Furthermore, in the case where the type of the attached interchangeable lens is a type that requires different optical parameters than the predetermined optical parameters for identifying the optical correction value, the necessary optical parameters are obtained. The optical correction value is identified based on the type of the attached interchangeable lens using the predetermined optical parameters, other optical parameters, and so on, and optical correction is then carried out.

29 Claims, 13 Drawing Sheets

(51) Int. Cl.
*H04N 5/232* (2006.01)
*G03B 17/14* (2006.01)

(58) Field of Classification Search
USPC .......................................... 348/345
See application file for complete search history.

(56) References Cited

FOREIGN PATENT DOCUMENTS

| | | |
|---|---|---|
| JP | 2000-184247 A | 6/2000 |
| JP | 2005-286482 A | 10/2005 |
| JP | 2009-290732 A | 12/2009 |
| JP | 2010-193277 A | 9/2010 |
| JP | 2010-206374 A | 9/2010 |
| JP | 2010-206580 A | 9/2010 |
| WO | 2010/067740 A1 | 6/2010 |

OTHER PUBLICATIONS

Jun. 6, 2014 Japanese Office Action, of which is enclosed without an English Translation, that issued in Japanese Patent Application No. 2012-162122.

A Search Report issued on Jun. 24, 2014, of which is enclosed, that issued in the corresponding European Patent Application No. 13176724.6.

Feb. 26, 2016 Chinese Office Action, which is enclosed with an English Translation, that issued in Chinese Patent Application No. 201310308660.1.

\* cited by examiner

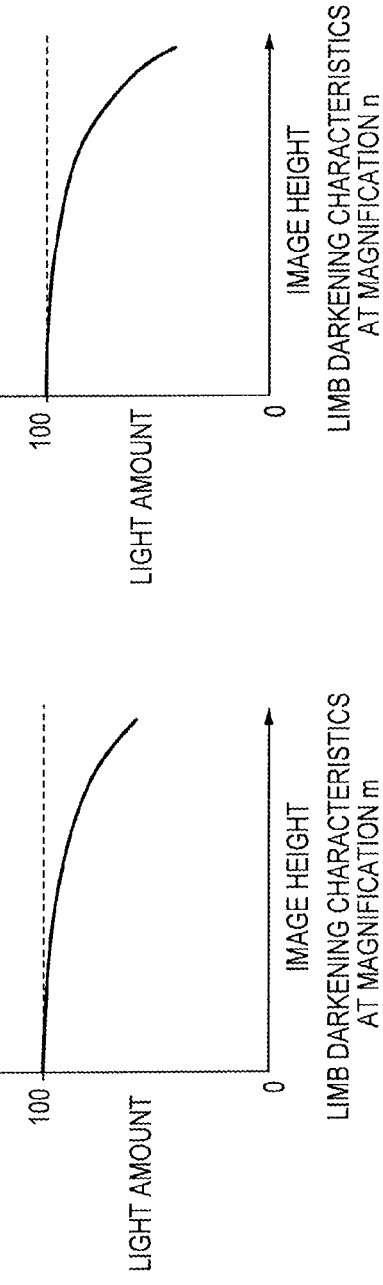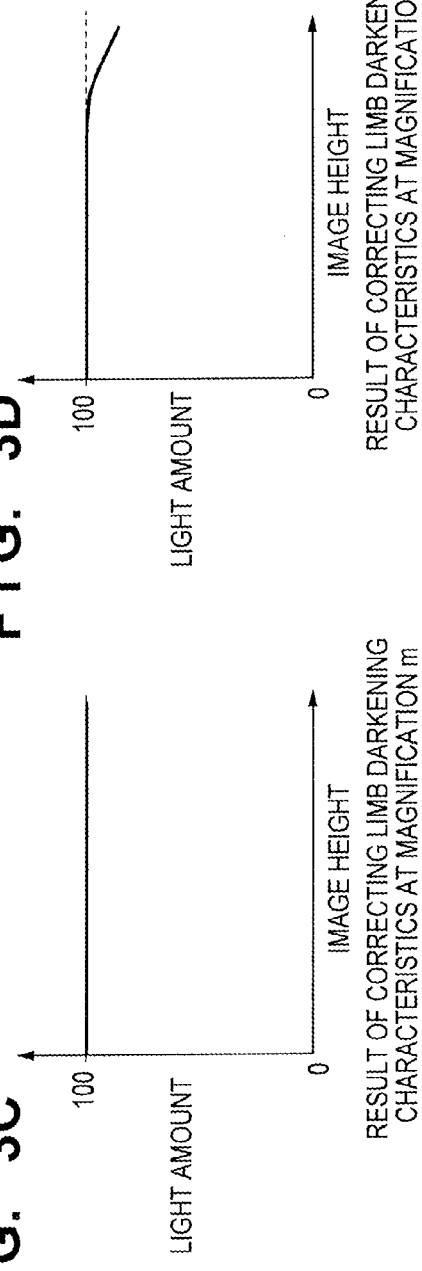

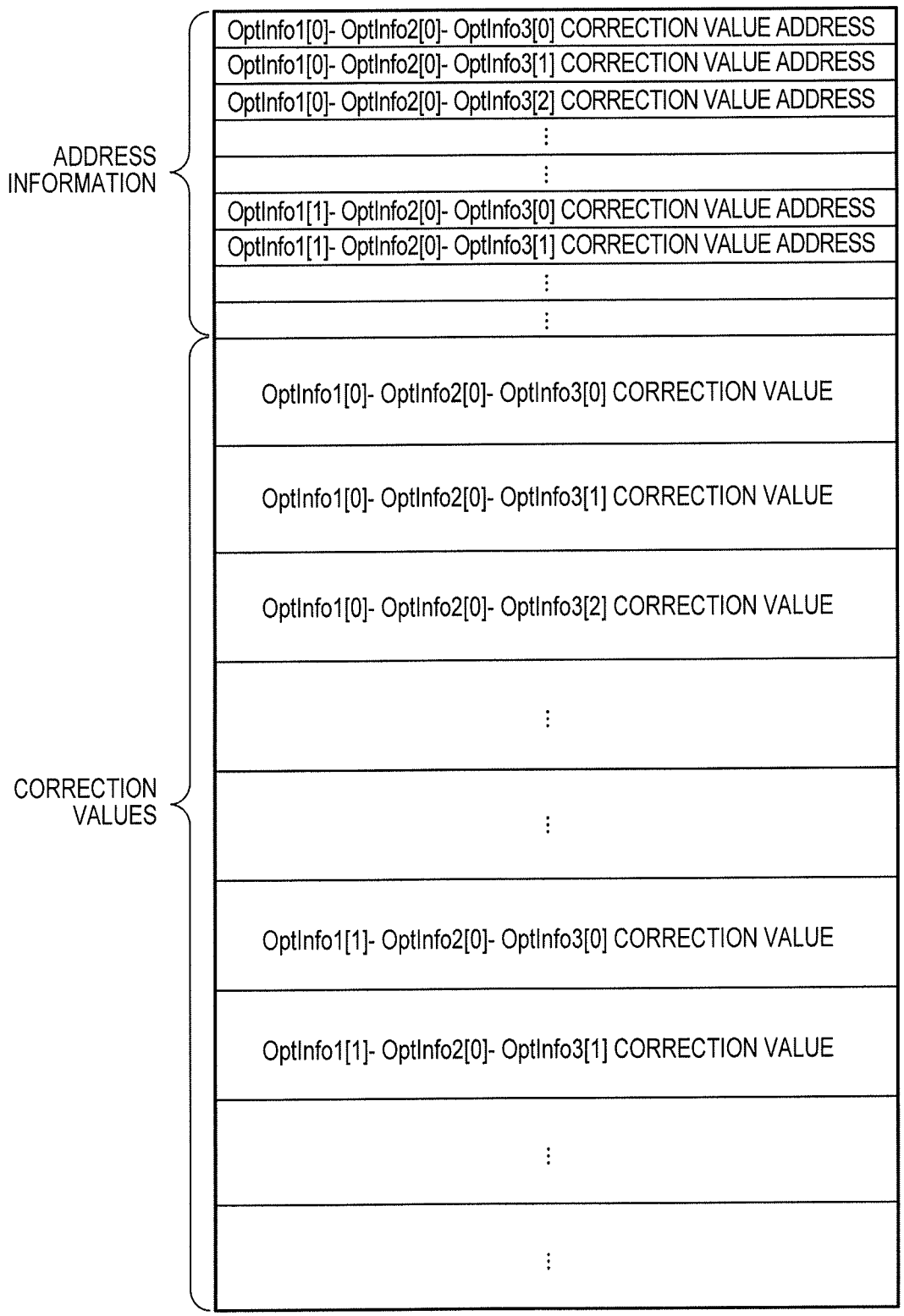
FIG. 9A  LENS TYPE 1 CORRECTION DATA STRUCTURE

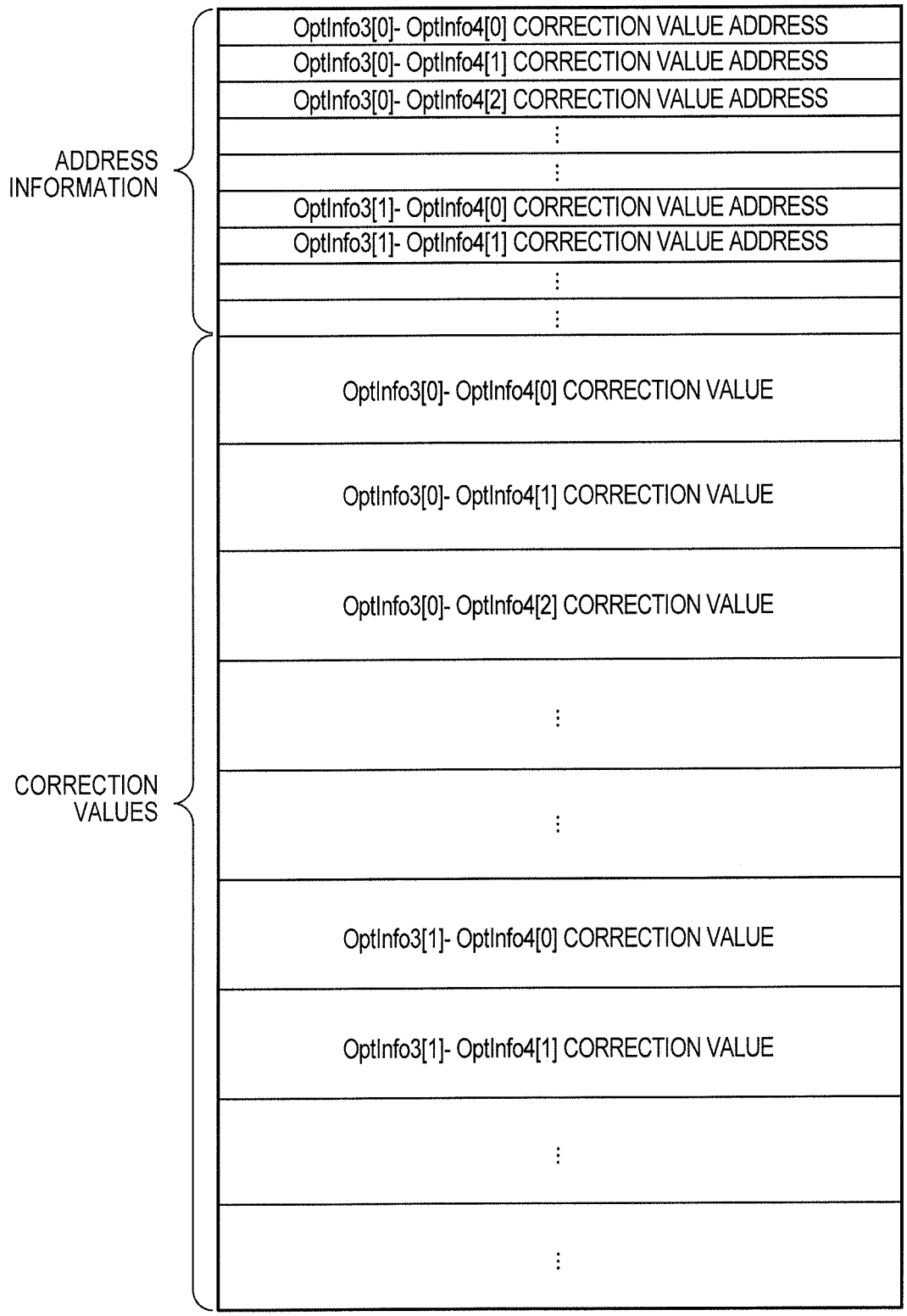
FIG. 9B    LENS TYPE 2 CORRECTION DATA STRUCTURE

LIMB DARKENING CHARACTERISTICS
AT MAGNIFICATION m

LIMB DARKENING CHARACTERISTICS
AT MAGNIFICATION n

RESULT OF CORRECTING LIMB DARKENING
CHARACTERISTICS AT MAGNIFICATION m

RESULT OF CORRECTING LIMB DARKENING
CHARACTERISTICS AT MAGNIFICATION n

IMAGE CAPTURE APPARATUS CAPABLE OF CORRECTING EFFECTS OF OPTICAL CHARACTERISTICS OF A LENS UNIT ON AN IMAGE AND CONTROL METHOD THEREOF, AND LENS UNIT

BACKGROUND OF THE INVENTION

Field of the Invention

The present invention relates to image capture apparatuses and control methods thereof, and particularly relates to techniques for correcting effects of optical characteristics of a lens unit on an image.

The present invention also relates to lens units that make it easy for image capture apparatuses to correct effects that optical characteristics of the lens unit have on an image.

Description of the Related Art

There is constant demand for image capture apparatuses such as digital cameras to output images with high image quality, and the optical characteristics of lens units used to form subject images are one cause of image quality deterioration. Limb darkening, distortion, chromatic aberration of magnification, and so on can be given as examples of optical characteristics that cause image deterioration, but it is difficult to implement a lens unit that completely eliminates such characteristics. Accordingly, techniques that correct image deterioration caused by optical characteristics by applying image processing to captured images (that is, optical correction techniques) are known.

Meanwhile, the optical characteristics vary within a single lens unit as well, depending on the focal length (angle of view of a zoom lens), shooting distance (focusing distance), optical parameter values such as the aperture value, and so on. Thus when using image processing to correct image deterioration caused by optical characteristics, it is necessary to use optical correction values that correspond to the optical parameters set during shooting in order to achieve an accurate correction.

Japanese Patent Laid-Open No. 2005-286482 proposes a method for determining an optical correction amount based on a polynomial approximation generated from the transition in a distortion correction amount that is based on the zoom position (focal length) of a zoom lens.

With a fixed-lens image capture apparatus, optical correction values can be found in advance for all sets of optical parameter values. A configuration that stores only discrete sets that are actually required based on a storage capacity or the like and finds sets that are not stored through interpolation is possible, and such a configuration makes it comparatively easy to ensure correction accuracy.

On the other hand, in the case of an interchangeable-lens image capture apparatus, a large number of types of lens units can be attached, including special lenses such as macro lenses, shift lenses, and so on.

As mentioned above, the optical characteristics of a single interchangeable lens will differ for each set of a plurality of optical parameters. In a typical lens, it is possible to uniquely find optical correction values based on sets of the focal length, shooting distance, and aperture value, but due to an increased variety in lens units, it is sometimes necessary to employ other optical parameters in order to identify the optical correction values. This will be described hereinafter.

FIG. 2 is a diagram illustrating an example of a relationship between a magnification rate and a shooting distance in a single focus macro lens capable of shooting from life-size magnification to n-times magnification. Although the shooting distance is the same value at a magnification of m and a magnification of n in this example, the optical characteristics change as a result of the magnification changing, and thus the optical correction value is different when the magnification is m and when the magnification is n.

FIGS. 3A to 3D are diagrams illustrating examples of limb darkening properties of the macro lens having the characteristics shown in FIG. 2 and results of correcting the limb darkening using optical correction values found based on the shooting distance illustrated in FIG. 2. Specifically, how the brightness (light amount) of an image obtained by shooting a subject having a uniform luminosity changes depending on the image height, which corresponds to a distance from the center of the image, is illustrated, taking the brightness of the center of the image as a value of 100.

FIGS. 3A and 3B illustrate the limb darkening characteristics of the macro lens when the magnification is m and when the magnification is n, respectively. Although both cases exhibit a decrease in the light amount as the image height increases (that is, as the image progresses from the center toward the periphery), the characteristics are different. Accordingly, for at least one of the magnification of m and the magnification of n, the optical correction value for limb darkening that should be used cannot be identified from sets of the focal length, shooting distance, and aperture value.

FIGS. 3C and 3D illustrate examples of results of correction using optical correction values identified without taking the magnification into consideration. In this example, limb darkening is properly corrected in the case where the magnification is m, but the correction is insufficient in the case where the magnification is n, leading to improper correction being carried out. In this manner, depending on the lens unit, there are cases where a proper optical correction value cannot be determined using only the information of the focal length, shooting distance, and aperture value.

To perform proper optical correction on an image shot using, for example, a macro lens having the characteristics illustrated in FIG. 2, information for identifying the magnification is necessary. For example, the magnification can be mechanically set by manually manipulating a zoom ring for changing the magnification provided on the lens unit, and a proper optical correction value can be identified if the magnification that has been set is known.

Accordingly, to apply the proper optical correction to images that can be shot by a variety of types (models) of lens units in an interchangeable-lens image capture apparatus, it is necessary to obtain the optical parameter values required to identify optical correction values for each lens unit model.

However, the conventional technique disclosed in Japanese Patent Laid-Open No. 2005-286482 does not take into consideration cases where the types of optical parameters required to identify the optical correction values differ from lens unit model to lens unit model, and thus does not provide a solution to the aforementioned problem.

SUMMARY OF THE INVENTION

Having been achieved in light of such problems with the conventional techniques, it is an aspect of the present invention to provide an image capture apparatus capable of proper optical correction even in the case where optical parameters required for identifying optical correction values differ from lens unit model to lens unit model.

According to an aspect of the present invention, there is provided an image capture apparatus, which a lens unit can be attached to and detached from, that has an optical correction function for correcting an effect, which is caused by optical characteristics of a lens unit used in shooting, on a shot image by applying image processing using an optical correction value to the image, the apparatus comprising: an obtaining unit adapted to obtain, from an attached lens unit, optical parameters regarding the optical characteristics present during shooting, the obtaining unit obtaining first optical parameters in the case where the attached lens unit is a first lens unit and obtaining second optical parameters including different parameters than the first optical parameters in the case where the attached lens unit is a second lens unit; and a correction unit adapted to correct a shot image based on the optical characteristics of the attached lens unit by applying the image processing using the optical correction value to the shot image, wherein the correction unit uses an optical correction value based on the first optical parameters in the case where the attached lens unit is the first lens unit and uses an optical correction value based on the second optical parameters in the case where the attached lens unit is the second lens unit.

According to another aspect of the present invention, there is provided a lens unit that can be attached to and detached from an image capture apparatus, the lens unit comprising: a communication unit adapted to communicate with the image capture apparatus to which the lens unit is attached; a memory in which an optical correction value for correcting, through image processing, image deterioration caused by optical characteristics of the lens unit is stored; a notification unit adapted to notify the image capture apparatus to which the lens unit is attached that first optical parameters and second optical parameters that are different from the first optical parameters and that correspond to the optical correction value are present; and a control unit adapted to transmit the optical correction value, the first optical parameters, and the second optical parameters to the image capture apparatus to which the lens unit is attached via the communication unit.

According to a further aspect of the present invention, there is provided a control method for an image capture apparatus, which a lens unit can be attached to and detached from, that has an optical correction function for correcting an effect, which is caused by optical characteristics of a lens unit used in shooting, on a shot image by applying image processing using an optical correction value to the image, the method comprising: a step of obtaining, from an attached lens unit, optical parameters regarding the optical characteristics present during shooting, the step obtaining first optical parameters in the case where the attached lens unit is a first lens unit and obtaining second optical parameters including different parameters than the first optical parameters in the case where the attached lens unit is a second lens unit; and a step of correcting a shot image based on the optical characteristics of the attached lens unit by applying the image processing using the optical correction value to the shot image, wherein the step of correcting uses an optical correction value based on the first optical parameters in the case where the attached lens unit is the first lens unit and uses an optical correction value based on the second optical parameters in the case where the attached lens unit is the second lens unit.

According to another aspect of the present invention, there is provided a non-transitory computer-readable medium storing a program that causes a computer to execute each steps in a control method according to present invention.

Further features of the present invention will become apparent from the following description of exemplary embodiments (with reference to the attached drawings).

BRIEF DESCRIPTION OF THE DRAWINGS

FIGS. 3A to 3D are diagrams illustrating examples of limb darkening properties of a macro lens having the characteristics shown in FIG. 2 and results of correcting the limb darkening using optical correction values found based on the shooting distance illustrated in FIG. 2.

FIG. 9A is a diagram illustrating an example of the structure of optical correction data stored in the memory 106 shown in FIG. 1.

FIG. 9B is a diagram illustrating an example of the structure of optical correction data stored in the memory 106 shown in FIG. 1.

DESCRIPTION OF THE EMBODIMENTS

Exemplary embodiments of the present invention will now be described in detail in accordance with the accompanying drawings.

First Embodiment

Figure 1:
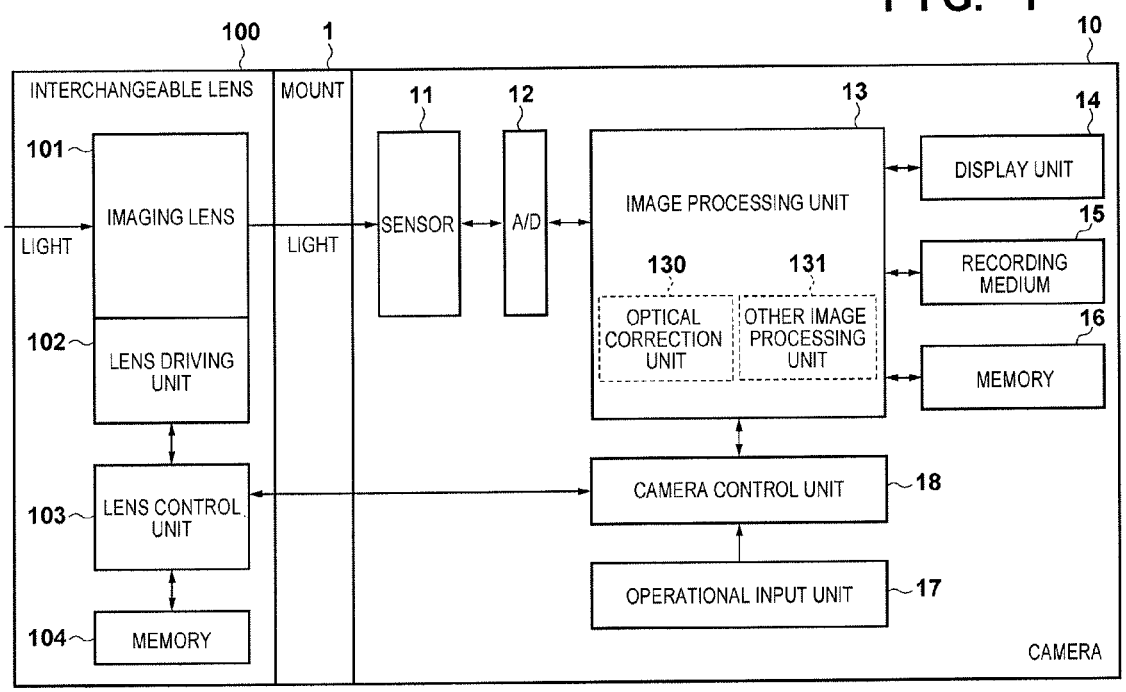
FIG. 1 is a block diagram illustrating an example of the functional configuration of an interchangeable lens-type digital camera system serving as an example of an image capture apparatus according to a first embodiment of the present invention.
Figure 2:
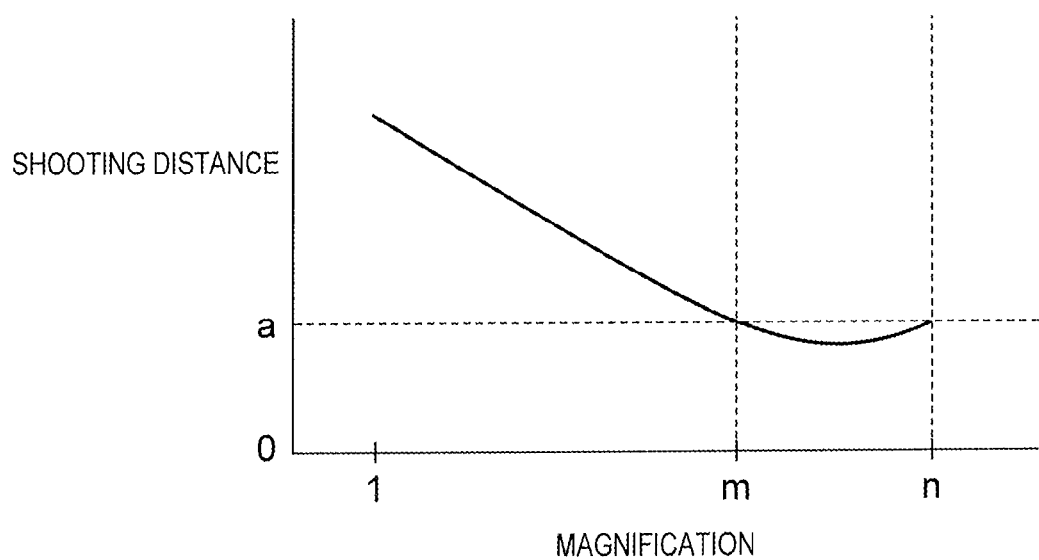
FIG. 2 is a diagram illustrating an example of a relationship between a magnification and a shooting distance in a single focus macro lens.

FIG. 1 is a block diagram illustrating an example of the functional configuration of an interchangeable lens-type digital camera system serving as an example of an image capture apparatus according to a first embodiment of the present invention. The camera system is configured of a camera 10 and an interchangeable lens 100, which is a lens unit that can be attached to/detached from the camera 10. A mount 1 is a mechanism for attaching the interchangeable lens 100 to the camera 10 in a detachable state, and includes electrical connection points for enabling the camera 10 to supply power to the interchangeable lens 100, enabling the camera 10 and the interchangeable lens 100 communicate with each other, and so on. The mount 1 is divided into a section provided in the camera 10 and a section provided in the interchangeable lens 100, but is illustrated in FIG. 1 as a single unit for the sake of simplicity.

An image sensor (imaging element) 11 is a photoelectric conversion device having a plurality of pixels. The image sensor 11 uses each pixel to perform photoelectric conversion on a subject image formed by an imaging lens 101 within the interchangeable lens 100, and outputs an analog electrical signal corresponding to the subject image. An A/D conversion unit 12 converts the analog electrical signal output from the image sensor 11 into a digital signal. An image processing unit 13 generates image data by applying various types of image processing to the digital signal output by the A/D conversion unit 12. The image processing unit 13 includes an optical correction unit 130 that provides an optical correction function for correcting an effect caused by optical characteristics of the imaging lens 101 on an image through image processing, and an other image processing unit 131 that carries out what are known as developing processes, such as pixel interpolation processing, luminosity signal processing, color signal processing, and so on. The image data generated by the image processing unit 13 is displayed in a display unit 14, recorded in a recording medium 15 such as a memory card, or the like.

A memory 16 is used as a processing buffer for the image processing unit 13, and as a storage device for programs executed by a camera control unit 18, which will be mentioned later. The memory 16 is used as a storage device for optical correction data, mentioned later, that defines optical correction values used by the optical correction unit 130, as a storage device for GUI data such as menu screens displayed by the camera 10 in the display unit 14, and so on.

An operation input unit 17 is an input device group through which a user inputs instructions to the camera 10, and includes a power switch for turning the power on/off, a shooting switch for starting the recording of images, a select/OK switch for making settings in various types of menus, and so on. The camera control unit 18 includes a microcomputer, and controls the overall operations of the camera system, such as controlling the image processing unit 13 and controlling communications with the interchangeable lens 100, by executing programs stored in the memory 16.

A lens driving unit 102 provided in the interchangeable lens 100 drives an actuator, a motor, and the like of the imaging lens 101 under the control of a lens control unit 103. The actuator, motor, and the like of the imaging lens 101 move or operate a focus lens, a zoom lens, an aperture, an image stabilization lens, and so on provided in the imaging lens 101. The lens control unit 103 includes a microcomputer, and controls the lens driving unit 102 in accordance with control signals received from the camera control unit 18 via the mount 1. A memory 104 is used as a storage device for various types of data used by the lens control unit 103.

Figure 4:
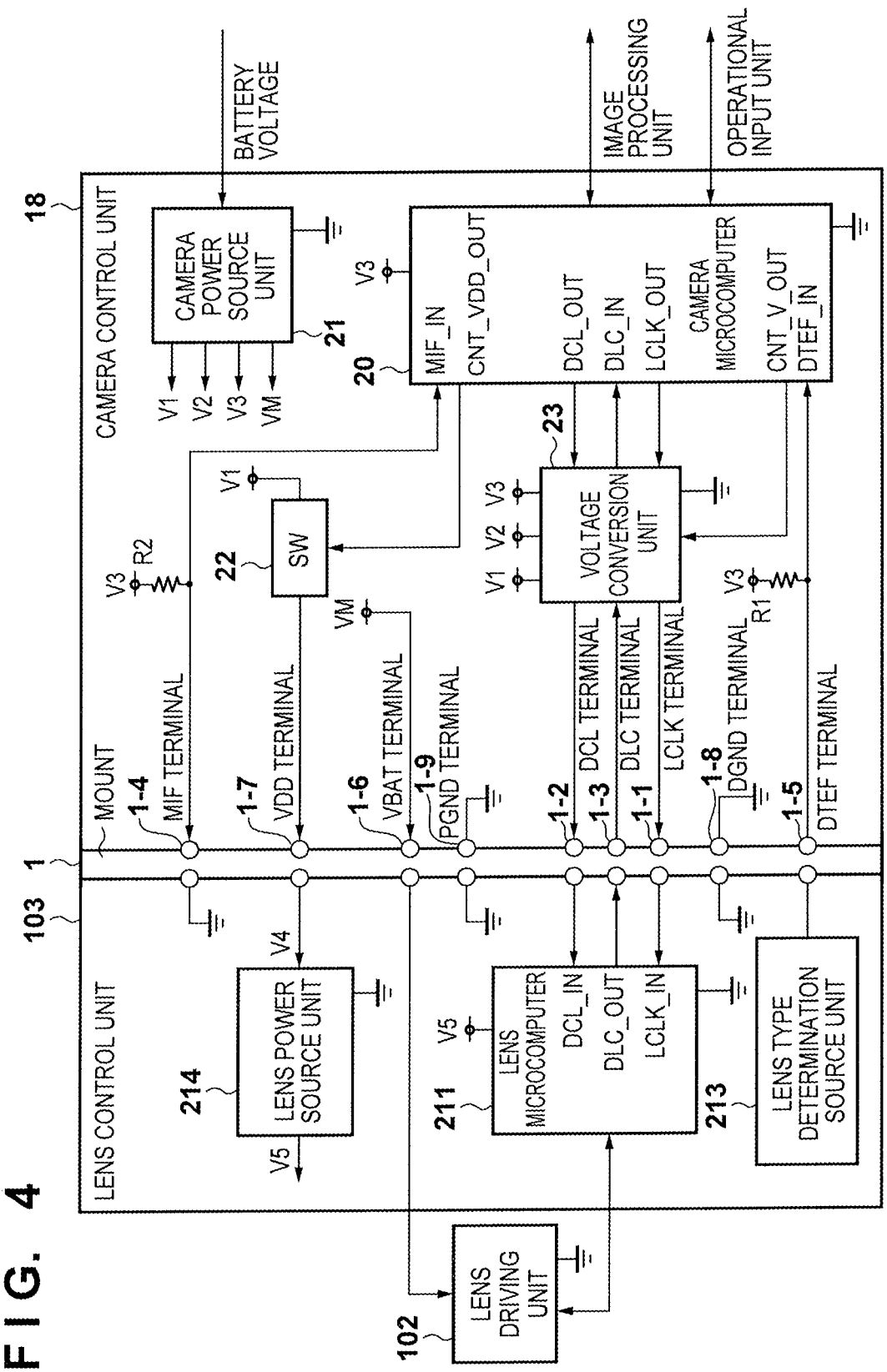
FIG. 4 is a block diagram illustrating an example of a configuration for communication between a camera control unit and a lens control unit shown in FIG. 1.

FIG. 4 is a block diagram illustrating an example of a configuration for communication between the camera control unit 18 and the lens control unit 103 shown in FIG. 1.

First, terminals provided in the mount 1 will be described. An LCLK terminal 1-1 is a terminal for a communication clock signal output to the interchangeable lens 100 from the camera 10. A DCL terminal 1-2 is a terminal for communication data output to the interchangeable lens 100 from the camera 10. A DLC terminal 1-3 is a terminal for communication data output to the camera 10 from the interchangeable lens 100.

An MIF terminal 1-4 is a terminal for detecting that the interchangeable lens 100 has been attached to the camera 10. A microcomputer (called a camera microcomputer hereinafter) 20 within the camera control unit 18 detects that the interchangeable lens 100 has been attached to the camera 10 based on a voltage from the MIF terminal 1-4.

A DTEF terminal 1-5 is a terminal for detecting the type of the interchangeable lens 100 attached to the camera 10. The camera microcomputer 20 detects the type of the interchangeable lens 100 attached to the camera 10 based on a voltage from the DTEF terminal 1-5.

A VBAT terminal 1-6 is a terminal for supplying driving power (VM) used in various types of operations aside from communication control from the camera 10 to the interchangeable lens 100. A VDD terminal 1-7 is a terminal that supplies communication control power (VDD) used in communication control from the camera 10 to the interchangeable lens 100. A DGND terminal 1-8 is a terminal that connects the communication control system between the camera 10 and the interchangeable lens 100 to a ground. A PGND terminal 1-9 is a terminal for connecting mechanical driving systems, including the actuator, motor, and the like provided in the camera 10 and the interchangeable lens 100, to a ground.

A plurality of types of interchangeable lenses 100 having different communication voltages with the camera 10 can be attached to the camera 10 according to the present embodiment. For the sake of simplicity, and to facilitate understanding, the following descriptions assume that there are two types of interchangeable lenses 100 identified by the camera 10 based on the voltage at the DTEF terminal 1-5. Specifically, these types are a first interchangeable lens (a first lens unit) and a second interchangeable lens (second lens unit) that has a different communication voltage than the first lens unit.

Note that the "type" detected based on the voltage at the DTEF terminal 1-5 refers to a "type" classified based on types of optical parameters necessary for identifying an optical correction value, and does not necessarily correspond to what is known as the "model type". Furthermore, the "type" of the interchangeable lens and the types of optical parameters necessary for identifying the optical correction value can be stored in association with each other in advance in, for example, the memory 16.

In the present embodiment, the first interchangeable lens is an interchangeable lens for which the optical parameters necessary for identifying the optical correction value are information enabling the focal length (unit: mm), the shooting distance (unit: cm), and the aperture value to be identified. The information enabling the focal length to be identified is, for example, a focal length value, a zoom lens position, or the like. The information enabling the shooting distance to be identified is, for example, a shooting distance value, a focus lens position, or the like. The information enabling the aperture value to be identified is, for example, an aperture value, a numerical value corresponding to an aperture value, or the like.

On the other hand, the second interchangeable lens is an interchangeable lens for which the parameters necessary for identifying the optical correction value are information capable of identifying an aperture value and a magnification. The information enabling the magnification to be identified is, for example, a magnification value, positional information of an optical component that controls the magnification, or the like. A macro lens is an example of an interchangeable lens that corresponds to the second interchangeable lens. The magnification of a macro lens changes depending on the optical component, whose position changes when a zoom ring is rotated. Accordingly, positional information of a magnification changing mechanism such as a zoom ring may be employed as the positional information of the optical component that controls the magnification, which in turn serves as the information enabling the magnification to be identified.

A camera power source unit 21 provided in the camera control unit 18 converts a battery voltage supplied from a battery installed in the camera 10 to a voltage required to operate the respective constituent elements. In the present embodiment, it is assumed that the camera power source unit 21 generates voltages V1, V2, V3, and VM.

The first voltage V1 is a power voltage that serves as the communication control voltage (VDD) for the first and second interchangeable lenses, and serves as the communication voltage of the first interchangeable lens. The second voltage V2 serves as the communication voltage of the second interchangeable lens. The third voltage V3 is a power voltage serving as operational power for the camera microcomputer 20. The fourth voltage VM is a power voltage serving as a driving voltage for the first and second interchangeable lenses.

When the power is instructed to be turned on using the power switch of the operation input unit 17, the camera microcomputer 20 outputs a signal for turning a switch 22 on from a CNT_VDD_OUT terminal, and starts the supply of VDD and VM from the camera 10 to the interchangeable lens 100. When the power is instructed to be turned off, the camera microcomputer 20 turns the switch 22 off by stopping the signal output from the CNT_VDD_OUT terminal, and stops the supply of VDD and VM from the camera 10 to the interchangeable lens 100.

The camera microcomputer 20 communicates with the interchangeable lens 100 via a voltage conversion unit 23. The camera microcomputer 20 includes an LCLK_OUT terminal that outputs a communication clock signal, a DCL_OUT terminal that outputs communication data to the interchangeable lens, and a DLC_IN terminal that accepts the input of communication data from the interchangeable lens. The communication clock signal and the communication data are communication signals.

The camera microcomputer 20 also includes an MIF_IN terminal for detecting that the interchangeable lens 100 has been attached, a DTEF_IN terminal for identifying the type of the interchangeable lens 100, and a CNT_$V_{OUT}$ terminal that outputs a communication voltage switching signal to the voltage conversion unit 23.

Furthermore, the camera microcomputer 20 includes the CNT_VDD_OUT terminal that outputs signals for turning the switch 22 on and off, a terminal for connecting to the image processing unit 13, and a terminal for connecting to the operation input unit 17.

A microcomputer 211 in the lens control unit 103 (called a lens microcomputer hereinafter) communicates with the camera microcomputer 20 via the voltage conversion unit 23 of the camera control unit 18. The lens microcomputer 211 includes an LCLK_IN terminal that accepts the input of the communication clock signal, a DLC_OUT terminal that outputs communication data to the camera 10, a DCL_IN terminal that accepts the input of communication data from the camera 10, and a terminal for connecting to the lens driving unit 102. In addition, the lens control unit 103 includes a lens power source unit 214 that generates an operational voltage for the lens microcomputer 211 from VDD.

Next, detecting the attachment of the interchangeable lens 100 to the camera 10 will be described. The MIF_IN terminal of the camera microcomputer 20 is pulled up to the power source by a resistance R2 (100 KΩ), and thus when the lens is not attached, the voltage value thereof is H (high). However, the MIF_IN terminal is connected to a GND in the interchangeable lens 100 when the interchangeable lens (the first and second interchangeable lenses) 100 is attached, and thus the voltage value thereof drops to L (low) when the interchangeable lens 100 is attached, regardless of the type of the interchangeable lens 100.

Figure 5A:
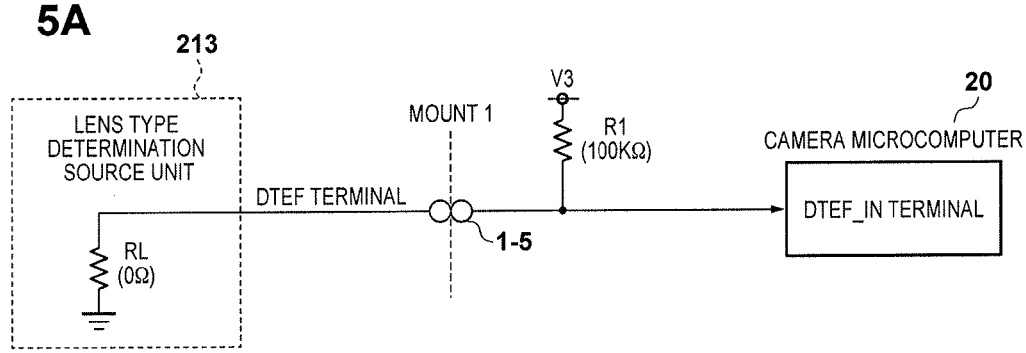
FIGS. 5A and 5B are diagrams illustrating examples of the configuration of a lens type determination source unit provided in the lens control unit shown in FIG. 4.
Figure 5B:
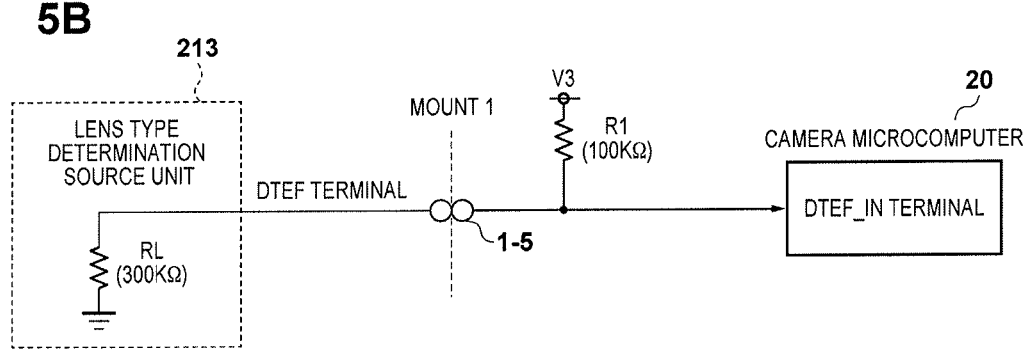

FIGS. 5A and 5B are diagrams illustrating examples of the configuration of a lens type determination source unit 213 provided in the lens control unit 103. The lens type determination source unit 213 is configured of an accessory-side resistance RL provided between the DTEF terminal provided in the mount 1 and a GND. The resistance value of the resistance RL is set in advance in accordance with the type of the interchangeable lens. For example, 0Ω is assumed at the resistance RL provided in the first interchangeable lens shown in FIG. 5A, whereas 300 KΩ is assumed at the resistance RL provided in the second interchangeable lens shown in FIG. 5B.

In the camera 10, a camera-side resistance R1 (at, for example, 100 KΩ) is connected between the DTEF terminal of the mount 1 and the operational power voltage (V3) of the camera microcomputer 20; furthermore, the DTEF terminal is connected to the DTEF_IN terminal of the camera microcomputer 20. The DTEF_IN terminal of the camera microcomputer 20 has an AD conversion function (here, a 10-bit AD conversion function with an input range of 0-1.0 V).

An operation performed by the camera microcomputer 20 for determining the type of the interchangeable lens will now be described. The camera microcomputer 20 determines the type of the attached interchangeable lens in accordance with the value of a voltage input into the DTEF_IN terminal. Specifically, the camera microcomputer 20 performs AD conversion on the input voltage value, and determines the lens type by comparing the AD-converted value with a lens type determination reference held by the camera microcomputer 20 in advance.

For example, in the case where the first interchangeable lens is attached, the AD-converted value of the voltage input into the DTEF_IN terminal is found to be approximately 0x0000, through a resistance ratio RL/(R1+RL) using the 100 KΩ of R1 and the 0Ω of RL. Accordingly, the camera microcomputer 20 detects that the AD-converted value of the DTEF_IN terminal is within a range of 0x0000 to 0x007F, which is a first lens type determination reference, and determines that the attached interchangeable lens is the first interchangeable lens.

On the other hand, in the case where the second interchangeable lens is attached, the AD-converted value of the voltage input into the DTEF_IN terminal is found to be approximately 0x02FF, through a resistance ratio RL/(R1+RL) using the 100 KΩ of R1 and 300 KΩ of RL. Accordingly, the camera microcomputer 20 detects that the AD-converted value of the DTEF_IN terminal is within a range of 0x0280 to 0x037F, which is a second lens type determination reference, and determines that the attached interchangeable lens is the second interchangeable lens.

As described earlier, the camera microcomputer 20 determines the type of the attached interchangeable lens 100 based on the value of a voltage input into the DTEF_IN terminal. The logic level of the signal output from the CNT_V_OUT terminal is then controlled in accordance with a result of the determination of the type of the interchangeable lens 100. Specifically, in the case where it has been determined from the voltage value at the DTEF_IN terminal that the attached interchangeable lens 100 is the first interchangeable lens, the camera microcomputer 20 controls the communication voltage to V1 by outputting an H level signal from the CNT_V_OUT terminal. On the other hand, in the case where it has been determined that the attached interchangeable lens 100 is the second interchangeable lens, the camera microcomputer 20 controls the communication voltage to V2 by outputting an L level signal from the CNT_V_OUT terminal.

In the case where a voltage value that is outside of the range of the aforementioned first and second lens type determination references has been detected as the voltage value (AD-converted value) at the DTEF_IN terminal, the camera microcomputer 20 determines that an "incompatible lens", which is an interchangeable lens that is not compatible with the camera 10, has been attached. Alternatively, a determination may be "reserved" under the assumption that the lens type determination cannot be correctly carried out. In this case, the camera microcomputer 20 does not communicate with the interchangeable lens 100.

Figure 6:
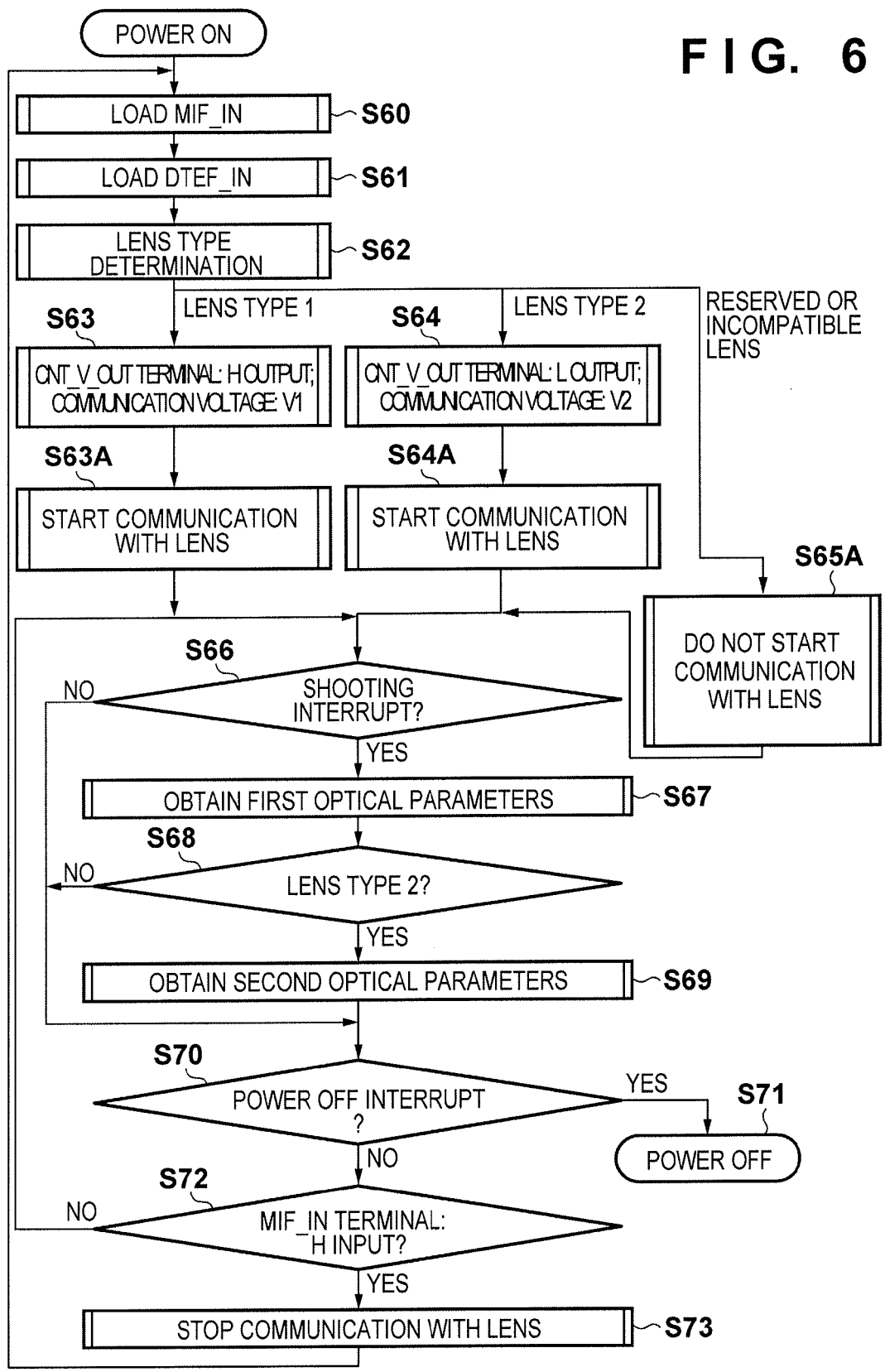
FIG. 6 is a flowchart illustrating a process for determining an interchangeable lens type and an optical parameter receiving process performed by the camera control unit according to the first embodiment of the present invention.

FIG. 6 is a flowchart illustrating a process for determining the interchangeable lens type and an optical parameter receiving process performed by the camera microcomputer 20 according to the present embodiment. The processing shown in FIG. 6 is performed by the camera microcomputer 20 executing programs stored in the memory 16.

The camera microcomputer 20 loads a voltage value H or L from the MIF_IN terminal in S60 and loads a voltage value from the DTEF_IN terminal in S61. Note that S60 and S61 may be executed simultaneously.

In the case where the voltage value at the MIF_IN terminal is L and the interchangeable lens 100 has been detected as being attached, in S62, the camera microcomputer 20 determines the type of the attached interchangeable lens 100 based on the (AD-conversion result of the) voltage value at the DTEF_IN terminal. In the case where it has been determined that the attached interchangeable lens 100 is the first interchangeable lens (indicated as "lens type 1" in FIG. 6), in S63, the camera microcomputer 20 sets the communication voltage to V1 by outputting H from the CNT_V_OUT terminal, and advances the processing to S63A. However, in the case where it has been determined that the attached interchangeable lens 100 is the second interchangeable lens (indicated as "lens type 2" in FIG. 6), in S64, the camera microcomputer 20 sets the communication voltage to V2 by outputting L from the CNT_V_OUT terminal, and advances the processing to S64A. Furthermore, in the case where the attached interchangeable lens 100 is neither the first nor the second interchangeable lens and a determination of "incompatible lens" or "reserved" has been made, the camera microcomputer 20 advances the processing to S65A.

In S63A and S64A, the camera microcomputer 20 starts communication with the interchangeable lens 100 using the set communication voltage. In S65A, the camera microcomputer 20 does not start communication with the attached interchangeable lens 100, and instead performs a process for issuing a warning or the like to the user.

In S66, the camera microcomputer 20 determines whether or not a shooting interrupt that starts the recording of an image has occurred due to the shooting switch of the operation input unit 17 being manipulated. In the case where the shooting interrupt has not occurred, the camera microcomputer 20 advances the processing to S70. However, in the case where the shooting interrupt has occurred, in S67, the camera microcomputer 20 obtains first optical parameters by communicating with the interchangeable lens 100.

As described above, the first optical parameters are information necessary for identifying the optical correction value for the lens type 1 interchangeable lens, and are basic optical parameters of the interchangeable lens, including information enabling at least the focal length, shooting distance, and aperture value to be identified. Because this information can be used in processes aside from optical correction, in the present embodiment, the first optical parameters are obtained regardless of what the type of the lens has been determined to be. In other words, in the present embodiment, the first optical parameters are obtained in S67 even in the case where it has been determined that the second interchangeable lens is attached.

Next, in S68 and S69, the camera microcomputer 20 obtains second optical parameters from the interchangeable lens 100 in the case where the interchangeable lens 100 has been determined in S62 to be the second interchangeable lens. The second optical parameters are optical parameters necessary for identifying the optical correction value of the second interchangeable lens. Because the second optical parameters normally include at least some of the parameters obtained as the first optical parameters, at least the second optical parameters that differ from the first optical parameters are obtained here. In the present embodiment, the second optical parameters include information enabling at least the magnification to be identified. Although the optical correction value can be identified from the magnification and the aperture value in the case where the second lens is a macro lens, the aperture value has already been obtained as part of the first optical parameters, and thus need not be obtained in S69. In this manner, the second optical parameters that overlap with the first optical parameters need not be re-obtained.

In S70, the camera microcomputer 20 determines whether or not a power off interrupt has occurred due to the power switch of the operation input unit 17 being turned off; in the case where a power off interrupt has occurred, in S71, a power off process is carried out. On the other hand, in the case where a power off interrupt has not occurred, in S72, the camera microcomputer 20 determines whether or not the voltage at the MIF_IN terminal is H level, or in other words, whether or not the interchangeable lens 100 has been removed from the camera 10. In the case where an H level voltage has been input from the MIF_IN terminal, in S73, the camera microcomputer 20 stops communication with the interchangeable lens 100 and returns the processing to S60. However, in the case where an H level voltage is not input from the MIF_IN terminal, the camera microcomputer 20 returns the processing to S66.

The camera control unit 18 can determine the type of the interchangeable lens 100 that is attached and can obtain the optical parameters necessary for identifying the optical correction value for the attached interchangeable lens 100 by performing such communication processing.

Although the example in FIG. 6 illustrates a method in which the type of the attached interchangeable lens 100 is determined in accordance with the value of the voltage input to the DTEF_IN terminal, it should be noted that another determination method may be used. For example, information regarding a lens type may be received from the interchangeable lens 100 immediately after S63A and the lens type may be determined based thereon, without performing the lens type determination of S61 and S62 and the setting of the output voltage based on the lens type in S63A and S64A.

Figure 7:
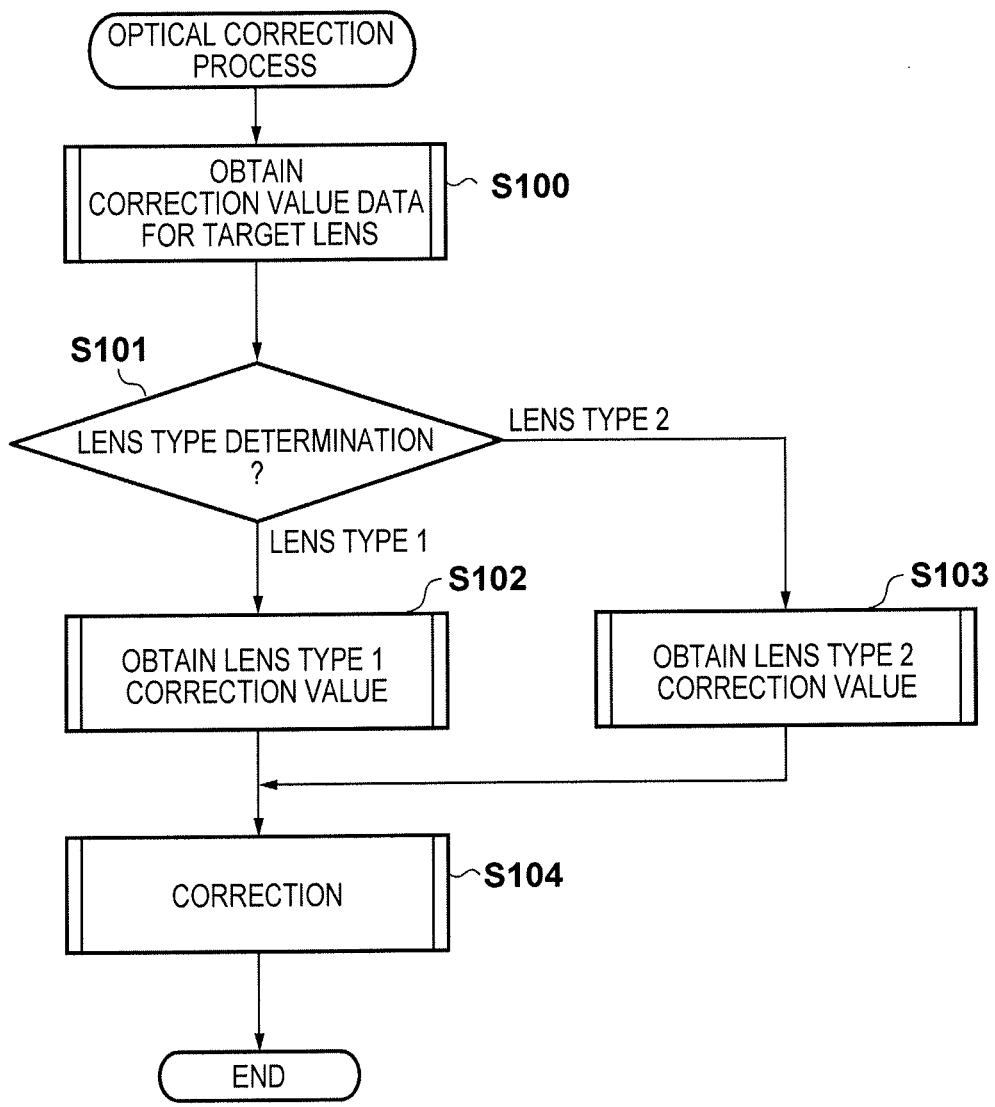
FIG. 7 is a flowchart illustrating an optical correction process according to the first embodiment of the present invention.

Next, an optical correction process performed by the optical correction unit 130 will be described. FIG. 7 is a flowchart illustrating the optical correction process performed by the optical correction unit 130.

First, in S100, the optical correction unit 130 obtains, from an optical correction data table held in the memory 16, optical correction data including the optical correction value corresponding to the interchangeable lens 100 used during shooting.

Figure 8:
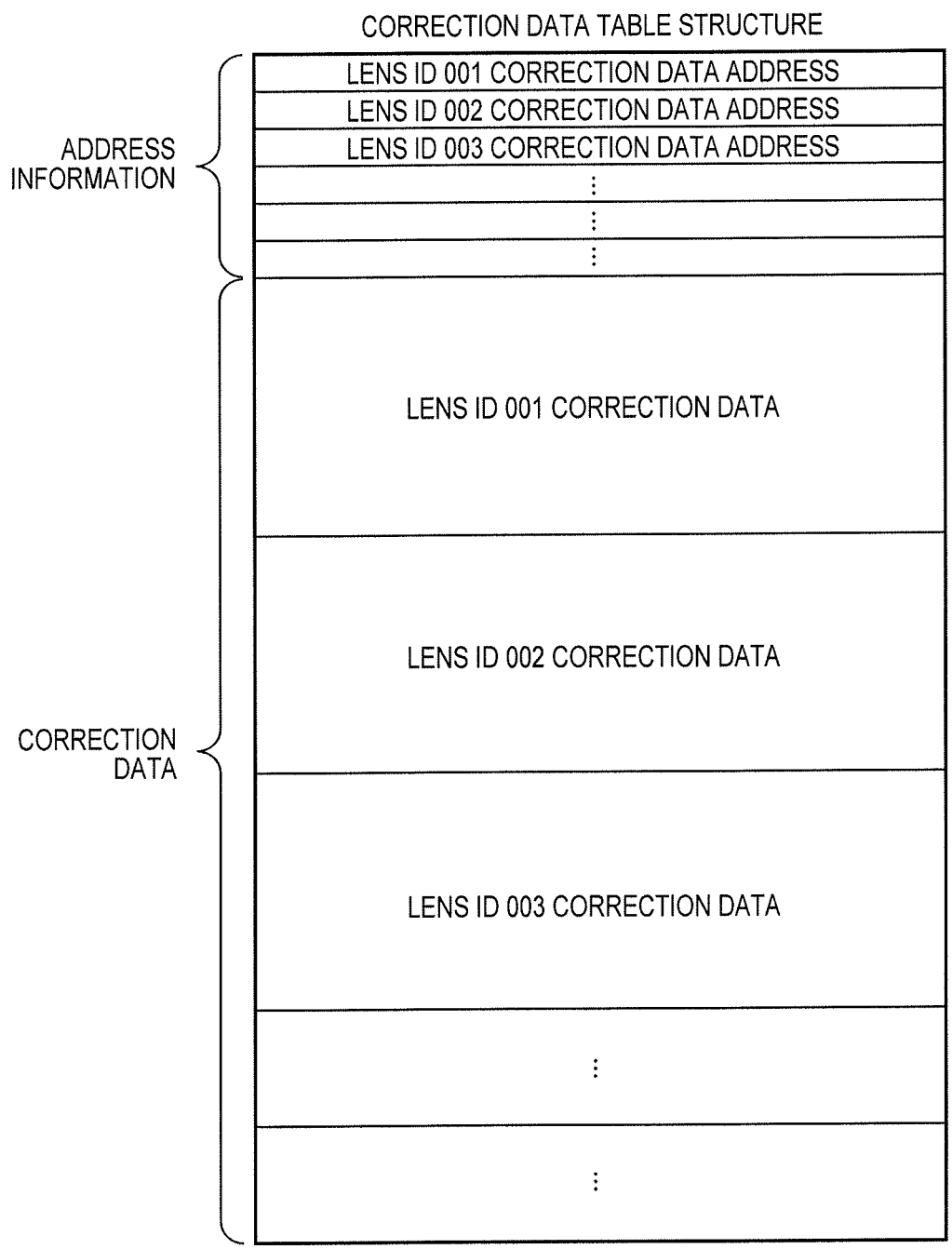
FIG. 8 is a diagram illustrating an example of the structure of optical correction data stored in a memory 106 shown in FIG. 1.

The memory 16 holds the optical correction data table having a structure such as that shown in FIG. 8, and the table holds the optical correction data for a plurality of interchangeable lens models. A lens ID, serving as a model identification information of the interchangeable lens 100, and information for identifying a starting address in which the corresponding optical correction data is stored, is recorded in an address information region provided at the top of the table. The optical correction data corresponding to each lens ID is stored in sequence in a correction data region. As will be described later, the correction data region is configured so that the optical correction value can be obtained from the first optical parameters for an interchangeable lens classified as the first interchangeable lens and from the second optical parameters for an interchangeable lens classified as the second interchangeable lens. First, the optical correction unit 130 searches out the ID of the interchangeable lens used during shooting from the address information region, and obtains the stored optical correction data from the address obtained from the address information region.

Next, in S101, the processing performed by the optical correction unit 130 branches based on the result of the lens type determination performed by the camera control unit 18 in S62 when the power is turned on, when the interchangeable lens 100 is replaced, or the like, as described above. In the case where the interchangeable lens 100 that has been attached is the first interchangeable lens, in S102, the optical correction unit 130 obtains the optical correction value from the correction data using the first optical parameters. On the other hand, in the case where the interchangeable lens 100 that has been attached is the second interchangeable lens, in S103, the optical correction unit 130 obtains the optical correction value from the correction data using the second optical parameters.

FIG. 9A illustrates the structure of the correction data corresponding to the first interchangeable lens. The correction data is configured of an address information region and a correction value region.

In FIGS. 9A and 9B, OptInfo1[n], OptInfo2[m], and OptInfo3[p] (where n, m, and p are each integers greater than or equal to 0) respectively indicate arrays of the following optical parameters that can apply to the interchangeable lens.

OptInfo1[n]: focal length information
OptInfo2[m]: shooting distance information
OptInfo3[p]: aperture value information Note that for information of values that can take on substantially continuous values, such as the focal length and the shooting distance, predetermined discrete values can be stored as array values.

For the first interchangeable lens, each set of the three types of optical parameters is set in the address information region along with information for identifying the storage address of the optical correction value corresponding to that set. The storage address is an address within the correction value region. The optical correction values corresponding to each set of optical parameters are stored in sequence in the correction value region.

Accordingly, the optical correction value can be obtained from the correction value region by referring to the address information region using the first optical parameters employed during shooting.

FIG. 9B illustrates the structure of the correction data corresponding to the second interchangeable lens. The correction data is configured of an address information region and a correction value region.

In FIGS. 9A and 9B, OptInfo3[p] and OptInfo4[q] (where p and q are each integers greater than or equal to 0) respectively indicate arrays of the following optical parameters that can apply to the interchangeable lens.

OptInfo3[p]: aperture value information
OptInfo4[q]: magnification information

For the second interchangeable lens, each set of the two types of optical parameters is set in the address information region along with information for identifying the address where the optical correction value corresponding to that set is stored. The storage address is an address within the correction value region. The optical correction values corresponding to each set of optical parameters are stored in sequence in the correction value region.

Accordingly, the optical correction value can be obtained from the correction value region by referring to the address information region using the second optical parameters employed during shooting.

Figure 10:
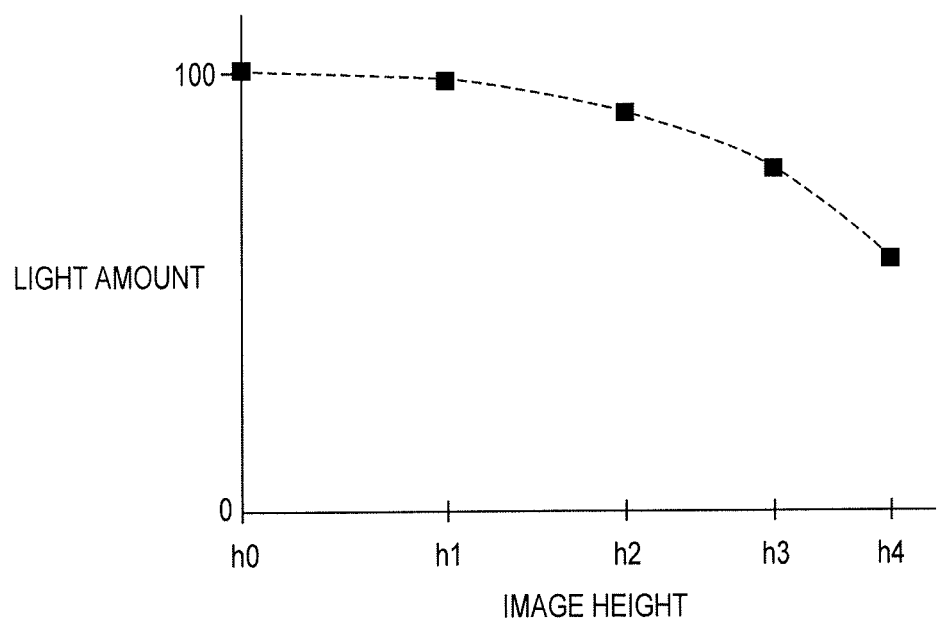
FIG. 10 is a diagram illustrating an example of optical correction values held for each of sets of optical parameters.

FIG. 10 is a diagram illustrating an example of optical correction values held for each of the sets of optical parameters shown in FIGS. 9A and 9B. FIG. 10 illustrates an example of a limb darkening correction value. In order to save on storage space, light amount values for discrete image heights h0 to h4 are held as the optical correction values, and a correction value can be obtained for given image height by approximating a discrete optical correction value through a polynomial expression and generating a correction curve.

In this manner, the optical correction values are stored for each set of optical parameters necessary for identifying the optical correction amounts, based on the lens type and the lens model (ID). Note that sets of the optical parameters stored in the address information region may also be taken as discrete sets, and for sets that are not stored, the optical correction values may be generated by interpolating a plurality of correction values corresponding to sets of similar values.

A correction method using image processing will be described next, using limb darkening as an example. First, the image height, which corresponds to the distance from the center of the image, is found for each pixel in the image data to be corrected, and light amounts corresponding to the image heights are found from a correction curve. Next, a gain based on the inverse of the light amount is applied to each pixel value. The limb darkening can be corrected by executing these processes for every pixel in the image data.

Figure 11A:
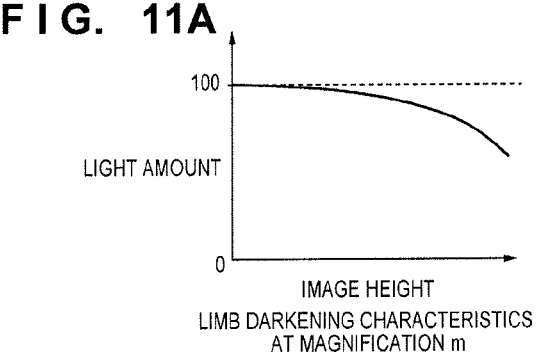
FIGS. 11A to 11D are diagrams illustrating examples of limb darkening properties of a macro lens having the characteristics shown in FIG. 2 and results of correcting the limb darkening using optical correction values obtained according to the first embodiment.
Figure 11B:
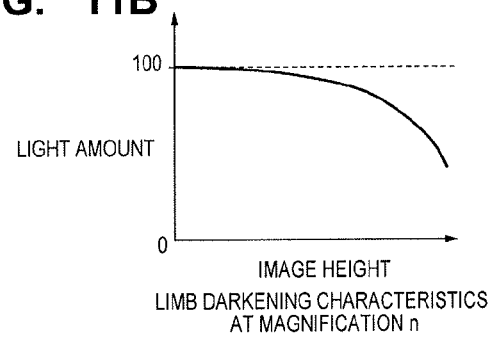

FIGS. 11A to 11D are diagrams illustrating examples of limb darkening characteristics of a macro lens and correction results obtained by applying the method of the present embodiment, in the same manner as in FIGS. 3A to 3D. FIGS. 11A and 11B illustrate the limb darkening characteristics of the macro lens when the magnification is m and when the magnification is n, respectively, and are thus the same as FIGS. 3A and 3B.

Figure 11C:
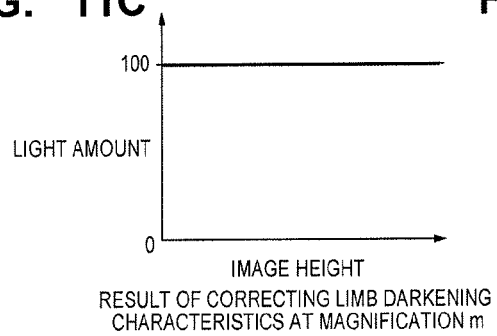
Figure 11D:
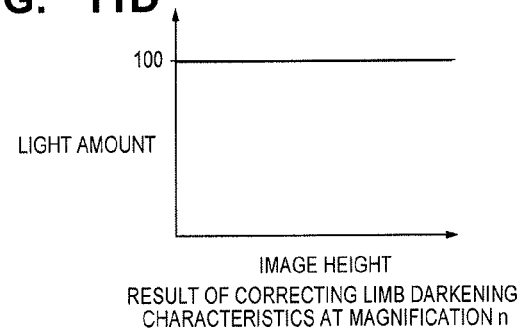

However, unlike the correction results illustrated in FIGS. 3C and 3D obtained using the optical correction values identified without taking the magnification into consideration, the correction in the present embodiment is carried out using optical correction values that take the magnification into consideration. Accordingly, as shown in FIGS. 11C and 11D, the brightness is essentially 100 for all image heights regardless of the magnification, and thus a highly-accurate corrected image can be obtained.

A case in which limb darkening, serving as an example of an optical characteristic that causes image deterioration, is corrected has been described here. However, the basic method of correction, in which a correction value based on the image height is found by generating a correction curve from discrete sets of image heights and correction amounts corresponding to sets of optical parameters, is the same for other optical characteristics, such as distortion and chromatic aberration of magnification, as it is for limb darkening.

In this manner, according to the present embodiment, the type of lens unit, for which the sets of optical parameters necessary for identifying the optical correction value differs from type to type, is determined, the appropriate optical parameters are obtained based on the type of the lens unit, and the optical correction value is identified. Accordingly, it is possible to realize a more accurate optical correction than the conventional technique of finding the optical correction value from sets of common types of optical parameters that do not vary from lens unit type to lens unit type.

Note that for the sake of simplicity, and to facilitate understanding, the present embodiment describes a case in which two types of lens units (or sets of optical parameters necessary for identifying the optical correction value) are determined. However, the invention is not limited to a case where there are two lens unit types or sets of optical parameters, and can be applied in the same manner for a larger number of types as well.

For example, the present embodiment describes a case in which a macro lens serves as a lens unit having the second optical parameters and the positional information of a mechanism for changing the magnification serves as the second optical parameters. However, the lens unit having the second optical parameters need not be a macro lens, and the second optical parameters may be information regarding the position of an optical component that controls the focal length, the shooting distance, or the like. In this case, the information regarding the position of the optical component is positional information of a mechanism that drives a lens in order to change the focal length, the shooting distance, or the like. It is possible to use information regarding the position of an optical component that controls the focal length, the shooting distance, or the like obtained as the second optical parameters to identify the optical correction value, rather than using the specific value of the focal length (unit: mm), the shooting distance (unit: cm), or the like obtained as the first optical parameters. With a system in which the positional information of the optical component has a higher resolution than the focal length (unit: mm), the shooting distance (unit: cm), and the like, highly-accurate optical correction can be realized by using the positional information of the optical component.

For example, the first lens unit may be a lens capable of providing only specific values (for example, XX mm or the like) for the focal length, whereas the second lens unit may be a lens capable of providing the focal length as positions of an optical component that controls the focal length (for example, positional information for a variable-power lens). In this case, the sets of optical parameters necessary for identifying the optical correction value may be the same for both the first lens unit and the second lens unit.

The positional information of the optical component may be positional information obtained when dividing a range of motion of the optical component by a predetermined number. For example, in the case of a lens unit in which the range of motion of a variable-power lens is divided by 32, the positional information may be provided as a value of 0, 1, 2, and so on up to 31. The camera microcomputer 20 can index the focal length from the positional information of the lens based on a relationship between the focal length range and the number of divisions for that lens unit. In other words, the focal length is not identified using the positional information of the optical component on its own. The information of the focal length range and number of divisions for the lens unit can be obtained when communication with the lens is started.

In the case where the attached lens has been determined to be the first lens unit, in S67, the first optical parameters are obtained, including the focal length information expressed in mm. Meanwhile, in the case where the attached lens has been determined to be the second lens unit, in S67, the first optical parameters are obtained, including the focal length information expressed in mm, and in S69, the focal length information, expressed at least as the positional information of an optical component, is obtained as the second optical parameters.

The focal length information expressed as the positional information of an optical component is used to identify the optical correction amount for the second lens unit. This enables a more accurate optical correction value to be obtained than in the case where the focal length information expressed in mm is used. This is because, as described above, the positional information of the optical component has a more accurate and detailed (that is, high-resolution) association with the focal length.

In this manner, the accuracy of the optical correction value can also be improved by switching between different optical parameters expressing the same information (the focal length) depending on the type of the lens unit. The switching can also be used in combination with a configuration in which the set of optical parameters necessary for identifying the optical correction value differs between the first lens unit and the second lens unit, namely the aforementioned macro lens and another type of lens.

For example, in the case where the first lens unit has been attached, it is further determined whether the lens unit is capable of providing the focal length information in mm only as the focal length in mm, or as a position of an optical component that controls the focal length. In the case of the latter, the position of the optical component that controls at least the focal length is obtained as the focal length information.

Second Embodiment

Next, a second embodiment of the present invention will be described.

The basic configuration of the image capture apparatus and the terminals provided in the mount 1 in the present embodiment are the same as those described in the first embodiment, but the present embodiment assumes that the second interchangeable lens is configured to transmit the optical correction data from the lens to the camera. Accordingly, the optical correction data is stored in the memory 104 provided in the second interchangeable lens. The optical correction data held here has the structure illustrated in FIG. 9B.

Figure 12:
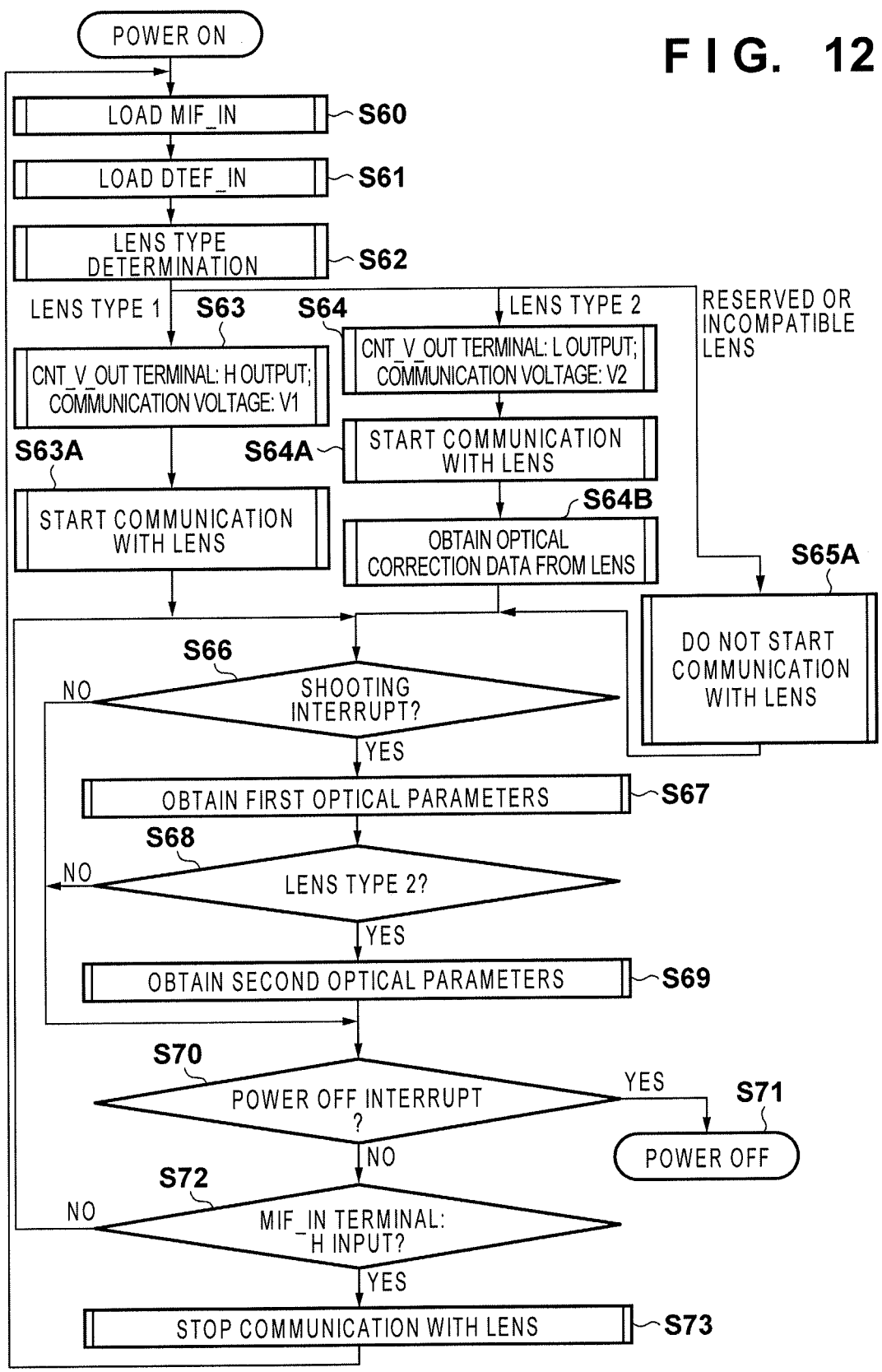
FIG. 12 is a flowchart illustrating a process for determining an interchangeable lens type and an optical parameter receiving process performed by the camera control unit according to a second embodiment of the present invention.

FIG. 12 is a flowchart illustrating a lens type determination process, an optical correction data receiving process, and a process for receiving the optical parameters used during shooting that are necessary to identify an optical correction value, carried out by the camera microcomputer 20 in the camera system according to the present embodiment. These processes are carried out by the camera microcomputer 20 executing programs stored in the memory 16. In FIG. 12, steps that carry out the same processes as shown in FIG. 6 and described in the first embodiment are given the same reference numerals, and descriptions thereof will be omitted.

Although the processing shown in FIG. 12 is basically the same as that in the first embodiment, the processing differs in that the camera microcomputer 20 carries out communication to obtain the optical correction data from the interchangeable lens 100 in S64B, after the lens type is determined to be the lens type 2 in S62 and communication is started in S64A. Through this process, the optical correction data stored in the memory 104 of the interchangeable lens 100 is transmitted to the camera 10 and saved in the memory 16 of the camera 10. The transmitted optical correction data has the data structure shown in FIG. 9B, and is configured so that the optical correction value can be identified from the first optical parameters obtained in S67 and the second optical parameters obtained in S69.

Note that the lens unit may notify the camera to which that lens unit is attached of the optical parameters (that can be provided to the camera) held by that lens unit itself. For example, the lens control unit 103 can notify the camera whether the lens unit has, as parameters expressing optical characteristics, only specific values or both specific values and positional information of an optical component. Alternatively, the lens control unit 103 may notify the camera of information enabling the camera to determine whether the lens unit has only specific values or both specific values and positional information of an optical component.

Note that in the case where the lens unit has both specific values and positional information of an optical component as parameters indicating the optical characteristics, the optical correction data stored in the memory 104 is optical correction data corresponding to the positional information of the optical component. This is because, as described above, using the positional information of the optical component provides a higher accuracy and higher resolution than the specific values.

In addition, in this case, information required for converting the positional information of the optical component to specific values is transmitted to the camera when the lens unit and the camera begin communication. For example, in the case where the lens unit has positional information of an optical component that adjusts the focal length, information regarding the focal length range of the lens unit and the number of divisions thereof is transmitted to the camera.

A table of the optical correction data held by the memory 16 has the structure shown in FIG. 8, and it is necessary to add the optical correction data received from the interchangeable lens 100 to the table so that that data can be referred to later. As described earlier, in the case where the interchangeable lens has been removed and then reattached, the processing returns to S60 through S73, after which the processing is repeated. In this case, to make it unnecessary to carry out communication for obtaining the optical correction data again in S64B, it is determined whether optical correction data corresponding to the interchangeable lens that has been attached is already present in the memory 16, and in the case where the data is already present, S64B may be skipped. By doing so, it is possible to cut down on the processing time required for communicating the optical correction data in the case where the camera already holds the optical correction data.

Through such processing, the optical correction data for the second interchangeable lens is obtained and the optical parameters for identifying the correction value are obtained from the obtained optical correction data.

The optical correction process performed by the optical correction unit 130 may be the same as that in the first embodiment. Because the optical correction data obtained from the second interchangeable lens is already stored in the memory 16, the correction value can be identified and the correction process can be performed by performing the processing illustrated in FIG. 7.

By transmitting the optical correction data from the lens unit to the camera and using that data to identify an optical correction value registered in the camera as in the present embodiment, appropriate optical correction can be carried out even in the case where optical correction data corresponding to the attached lens unit is not registered in the memory 16.

Although the present embodiment describes the second interchangeable lens transmitting the optical correction data to the camera, the present invention is not limited to such an embodiment, and a plurality of types of interchangeable lenses may transmit optical correction data to the camera. In addition, the sets of types of lenses that transmit optical correction data to the camera and optical parameters required by those types of lenses are not limited to those described in the present embodiment, and may correspond to a plurality of sets.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-162122, filed on Jul. 20, 2012, which is hereby incorporated by reference herein its entirety.

What is claimed is:
1. An image capture apparatus, which a lens unit can be attached to and detached from, comprising:
   a memory adapted to store optical correction data including an optical correction value for correcting, through image processing, image deterioration caused by optical characteristics of an attached lens unit; and a microprocessor that executes a program that causes the microprocessor to function as:
an obtaining unit adapted to obtain, from an attached lens unit, first optical parameters without second optical parameters in the case where the attached lens unit is a first lens unit, and to obtain the first optical parameters, the second optical parameters, and optical correction data in the case where the attached lens unit is a second lens unit, wherein the first optical parameters are corresponding to focal distance information and the second optical parameters are corresponding to positional information of a magnification changing mechanism included in the second lens unit; and
a processing unit adapted to:
apply image processing to an image using an optical correction value, which is included in the optical correction data initially stored in the memory and is associated with the first optical parameters in the case where the attached lens unit is the first lens unit; and
apply the image processing to an image using an optical correction value which is included in the optical correction data stored in the memory and is associated with the second optical parameters in the case where the attached lens unit is the second lens unit,
wherein, in the case where the attached lens unit is the second lens unit, the obtaining unit obtains the optical correction data from the attached lens unit before obtaining any of the first optical parameters and the second optical parameters.

2. The image capture apparatus according to claim 1, wherein the second optical parameters include positional information of an optical component, the positional information corresponding to parameters regarding optical characteristics included as a specific value in the first optical parameters.

3. The image capture apparatus according to claim 2, wherein when obtaining the second optical parameters, the obtaining unit obtains optical parameters aside from the optical parameters obtained as the first optical parameters.

4. The image capture apparatus according to claim 2, wherein the positional information of the optical component is one of numbers, each of the numbers indicating a respective position within a movable range of the optical component.

5. The image capture apparatus according to claim 2, wherein each of the first optical parameters is information of a specific value of focus distance.

6. The image capture apparatus according to claim 1, wherein the first optical parameters are a set of optical parameters necessary for identifying the optical correction value of the first lens unit and the second optical parameters are a set of optical parameters necessary for identifying the optical correction value of the second lens unit.

7. The image capture apparatus according to claim 1, further comprising,
wherein the obtaining unit obtains lens model identification information from the attached lens unit; and
wherein the processing unit identifies the optical correction data including the optical correction values to be used in the image processing by referring to the memory with the model identification information.

8. The image capture apparatus according to claim 1, wherein the first optical parameters and the second optical parameters are regarding the optical characteristics of the attached lens unit at the time when the image is shot.

9. The image capture apparatus according to claim 1, wherein the first optical parameters are different from the second optical parameters.

10. The image capture apparatus according to claim 1, wherein the obtaining unit obtains the first optical parameters and the second optical parameters without the optical correction data if the memory already stores the optical correction data corresponding to the second lens unit, in the case the attached lens unit is the second lens unit.

11. A lens unit that can be attached to and detached from an image capture apparatus, the lens unit comprising:
a memory, in which optical correction data including an optical correction value for correcting, through image processing, image deterioration caused by optical characteristics of the lens unit is stored; and
a microprocessor that executes a program that causes the microprocessor to function as:
a communication unit adapted to communicate with the image capture apparatus to which the lens unit is attached;
a notification unit adapted to notify the image capture apparatus to which the lens unit is attached that the lens unit contains first optical parameters and second optical parameters that are different from the first optical parameters; and
a control unit adapted to transmit either first optical parameters without second optical parameters or the first optical parameters, and the second optical parameters, and optical correction data stored in the memory, to the image capture apparatus via the communication unit, according to a request from the image capture apparatus, wherein the first optical parameters are corresponding to focal distance information and the second optical parameters are corresponding to positional information of a magnification changing mechanism included in the lens unit,
wherein the optical correction data is transmitted to the image capture apparatus before any of the first optical parameters and the second optical parameters are transmitted to the image capture apparatus.

12. The lens unit according to claim 11, wherein the second optical parameters are optical parameters used to identify the optical correction value of the lens unit.

13. The lens unit according to claim 12, wherein when transmitting the second optical parameters, the control unit transmits optical parameters aside from the optical parameters transmitted as the first optical parameters.

14. The lens unit according to claim 11, wherein the first optical parameters and the second optical parameters are regarding optical characteristics of the attached lens unit at the time when the image is shot.

15. The lens unit according to claim 11, wherein the first optical parameters are different from the second optical parameters.

16. The image capture apparatus according to claim 11, wherein the positional information of the magnification changing mechanism is one of numbers, each of the numbers indicating a respective position within a movable range of the magnification changing mechanism.

17. The image capture apparatus according to claim 16, wherein each of the first optical parameters is information of a specific value of focus distance.

18. The lens unit according to claim 11,
wherein the control unit transmits the first optical parameters and the second optical parameters without the optical correction data according to a request from the image capture apparatus, if a memory of the image capture apparatus already stores the optical correction data for the lens unit.

19. A control method for an image capture apparatus, which a lens unit can be attached to and detached from, and comprises a memory storing optical correction data including an optical correction value for correcting, through image processing, image deterioration caused by optical characteristics of an attached lens unit, wherein the method comprising:
obtaining, from an attached lens unit, first optical parameters without second optical parameters in the case where the attached lens unit is a first lens unit, and obtaining the first optical parameters, the second optical parameters, and optical correction data in the case where the attached lens unit is a second lens unit, wherein the first optical parameters are corresponding to focal distance information and the second optical parameters are corresponding to positional information of a mechanism for changing a magnification included in the second lens unit;
additionally storing the optical correction data from the second lens unit in the memory; and
applying image processing to an image using an optical correction value which is included in the optical correction data initially stored in the memory and is associated with the first optical parameters in the case where the attached lens unit is the first lens unit; and
applying the image processing to an image using an optical correction value which is included in the optical correction data stored in the memory and is associated with the second optical parameters in the case where the attached lens unit is the second lens unit,
wherein, in the case where the attached lens unit is the second lens unit, the obtaining obtains the optical correction data from the attached lens unit before obtaining any of the first optical parameters and the second optical parameters.

20. A non-transitory computer-readable medium storing a program that causes a computer of an image capture apparatus, which a lens unit can be attached to and detached from and comprises a memory storing optical correction data including an optical correction value for correcting, through image processing, image deterioration caused by optical characteristics of an attached lens unit, to execute a control method for the image capture apparatus comprising:
obtaining, from an attached lens unit, first optical parameters without second optical parameters in the case where the attached lens unit is a first lens unit, and obtaining the first optical parameters, the second optical parameters, and optical correction data in the case where the attached lens unit is a second lens unit, wherein the first optical parameters are corresponding to focal distance information and the second optical parameters are corresponding to positional information of a mechanism for changing a magnification included in the second lens unit;
additionally storing the optical correction data obtained from the second lens unit in the memory;
applying image processing to an image using an optical correction value which is included in the optical correction data initially stored in the memory and is associated with the first optical parameters in the case where the attached lens unit is the first lens unit; and
applying the image processing to an image using an optical correction value which is included in the optical correction data stored in the memory and is associated with the second optical parameters in the case where the attached lens unit is the second lens unit,
wherein, in the case where the attached lens unit is the second lens unit, the obtaining obtains the optical correction data from the attached lens unit before obtaining any of the first optical parameters and the second optical parameters.

21. A lens unit that can be attached to and detached from an image capture apparatus, the lens unit comprising:
a memory, in which optical correction data including an optical correction value for correcting, through image processing, image deterioration caused by optical characteristics of the lens unit is stored;
a microprocessor that executes a program that causes the microprocessor to function as:
a communication unit adapted to communicate with the image capture apparatus to which the lens unit is attached;
a control unit adapted to transmit first optical parameters and second optical parameters, and optical correction data stored in the memory, to the image capture apparatus via the communication unit, according to a request from the image capture apparatus,
wherein the first optical parameters are corresponding to focal distance information and the second optical parameters are corresponding to positional information of a magnification changing mechanism included in the lens unit,
wherein the optical correction data is transmitted to the image capture apparatus before any of the first optical parameters and the second optical parameters are transmitted to the image capture apparatus.

22. The lens unit according to claim 21,
wherein the second optical parameters include positional information of an optical component, the positional information corresponding to parameters regarding optical characteristics included as a specific value in the first optical parameters.

23. The lens unit according to claim 22,
wherein the positional information of the optical component is one of numbers, each of the numbers indicating a respective position within a movable range of the optical component.

24. The lens unit according to claim 22,
wherein each of the first optical parameters is information of a specific value focus distance.

25. The lens unit according to claim 21,
wherein the first optical parameters are a set of optical parameters necessary for identifying the optical correction value of a first lens unit and the second optical parameters are a set of optical parameters necessary for identifying the optical correction value of a second lens unit.

26. The lens unit according to claim 21, wherein the first optical parameters and the second optical parameters are regarding the optical characteristics of the attached lens unit at the time when the image is shot.

27. The lens unit according to claim 21, wherein the first optical parameters are different from the second optical parameters.

28. The lens unit according to claim 21,
wherein the control unit transmit the first optical parameters and the second optical parameters without the optical correction data according to a request from the image capture apparatus, if a memory of the image capture apparatus already stores the optical correction data for the lens unit.

29. A control method for a lens unit that can be attached to and detached from an image capture apparatus, wherein the lens unit comprises a memory, in which optical correction data including an optical correction value for correcting, through image processing, image deterioration caused by optical characteristics of the lens unit, the method comprising:
   communicating with the image capture apparatus to which the lens unit is attached;
   transmitting first optical parameters and second optical parameters, and optical correction data stored in the memory, to the image capture apparatus via the communication unit, according to a request from the image capture apparatus,
   wherein the first optical parameters are corresponding to focal distance information and the second optical parameters are corresponding to positional information of a magnification changing mechanism included in the lens unit,
   wherein the optical correction data is transmitted to the image capture apparatus before any of the first optical parameters and the second optical parameters are transmitted to the image capture apparatus.

* * * * *